US008136382B2

(12) United States Patent
Stewart

(10) Patent No.: US 8,136,382 B2
(45) Date of Patent: Mar. 20, 2012

(54) SELF-CALIBRATION OF SCALE FACTOR FOR DUAL RESONATOR CLASS II CORIOLIS VIBRATORY GYROS

(75) Inventor: Robert E. Stewart, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 63 days.

(21) Appl. No.: 12/800,090

(22) Filed: May 7, 2010

(65) Prior Publication Data

US 2010/0218587 A1    Sep. 2, 2010

(51) Int. Cl.
*G01P 21/00* (2006.01)
(52) U.S. Cl. ........................................................ 73/1.37
(58) Field of Classification Search .................... None
See application file for complete search history.

(56) References Cited

U.S. PATENT DOCUMENTS

| | | | | | |
|---|---|---|---|---|---|
| 2,452,335 | A | * | 10/1948 | Stoner | 73/504.11 |
| 3,241,363 | A | * | 3/1966 | Alderson et al. | 73/178 R |
| 3,445,847 | A | * | 5/1969 | Hammack | 342/465 |
| 4,262,861 | A | * | 4/1981 | Goldstein | 244/3.2 |
| 5,712,427 | A | * | 1/1998 | Matthews | 73/504.04 |
| 6,189,382 | B1 | * | 2/2001 | Johnson | 73/504.13 |
| 7,174,785 | B2 | * | 2/2007 | Stewart | 73/504.12 |
| 7,392,702 | B2 | * | 7/2008 | Stewart et al. | 73/504.12 |
| 7,565,839 | B2 | * | 7/2009 | Stewart et al. | 73/504.12 |
| 2006/0287824 | A1 | * | 12/2006 | Lin | 701/214 |

OTHER PUBLICATIONS

National Aeronautics and Space Administration Contract No. NAS 7-918; Switched Drive-Angle Continuously Auto-Tuning Zro-Calibrating; Nasa Tech Brief, vol. 27, No. 10, JPL New Technology Report NPO-30449; pp. 1-33; Oct. 2003.

* cited by examiner

*Primary Examiner* — Robert R Raevis
(74) *Attorney, Agent, or Firm* — Carmen Patti Law Group, LLC

(57) ABSTRACT

The method and apparatus in one embodiment may have: operating one of two resonators of a class II coriolis vibratory gyro in a closed loop mode and another of the two resonators in an open loop whole angle mode; sensing an angular rate by each of the two resonators; calibrating the scale factor of the closed loop resonator to yield the same integrated whole angle as measured by the open loop resonator; reversing operation of the two resonators such that the one of two resonators is operated in an open loop mode and the another of the two resonators in a closed loop whole angle mode; and alternately proceeding between open and closed loop operation of the two resonators, thereby self-calibrating scale factors respectively of the two resonators.

10 Claims, 3 Drawing Sheets

FIRST TIME INTERVAL

SECOND TIME INTERVAL

FIRST TIME INTERVAL

SECOND TIME INTERVAL

SELF-CALIBRATION OF SCALE FACTOR FOR DUAL RESONATOR CLASS II CORIOLIS VIBRATORY GYROS

CROSS-REFERENCE TO RELATED APPLICATIONS

This application contains subject matter that is related to the subject matter of the following applications, which is assigned to the same assignee as this application.

"Bias and Quadrature Reduction in Class II Coriolis Vibratory Gyros", Ser. No. 11/499,957, filed Aug. 7, 2006 (NGC-279/001039-199).

"Method for Modifying the Location of Nodal Points of a Vibrating Beam", Ser. No. 11/499,956, filed Aug. 7, 2006 (NGC-282/001047-199).

"Oscillation of Vibrating Beam in a First Direction for a First Time Period and a Second Direction for a Second Time Period to Sense Angular Rate of the Vibrating Beam," by Robert E. Stewart, application Ser. No. 11/057,324, filed Feb. 11, 2005 (NGC-167/000602-199).

TECHNICAL FIELD

The invention relates generally to Class II Coriolis Vibratory Gyros and, more particularly, to self-calibration of the scale factor of Class II Coriolis Vibratory Gyros.

BACKGROUND

In the case of the gyro, a specific class of gyro was identified in which the gyro bias reversed polarity when the drive and sense axes were interchanged. This particular class of gyro was identified as Class II Coriolis Vibratory Gyro and is characterized by being inherently counterbalanced, symmetrical about the input axis and having orthogonal degenerate vibration modes. Self calibration of the gyro bias is achieved by employing two gyros to measure the angular rate and sequentially reversing the gyro bias. The sequence of data from the gyros may be processed in an algorithm to solve for the gyro biases and subtract them from the measured rate. The two self-calibrated gyro angular rate measurements are averaged to reduce the angle random walk.

Self-calibration of a gyro bias under dynamic operating conditions requires the simultaneous measurement of angular rate by a pair of Class II Coriolis Vibratory Gyros (CVG) or a single gyro with dual sensing elements. Class II CVG are chosen for their ability to reverse polarity of the gyro bias by interchanging their drive and sense modes. An algorithm solves a set of four equations to estimate the gyro bias and subtract it from the measured angular rate. A Dual Resonator Gyro (DRG) may facilitate this simultaneous measurement of angular rate by a pair of gyros. System simulations have shown that the contribution of gyro bias uncertainty to the growth of position error of an inertial navigation system can be reduced by nearly three orders of magnitude using self calibration of gyro bias.

Gyro scale factor uncertainty is another source of error in inertial systems. The contribution to position error due to scale factor uncertainty is dependent on the magnitude of the angular rate experienced. Compensating for gyro scale factor uncertainty would further improve the performance of inertial navigation system.

There is a need in the art for improved methods for self-calibrating gyro scale factor.

SUMMARY

One embodiment of the present method and apparatus encompasses an apparatus. The apparatus may comprise: a first resonator receiving on an input thereof an angular rate; a second resonator receiving on an input thereof the angular rate; scale factor calibration unit operatively coupled to the first and second resonators; a first time interval during which the first resonator is operated in a closed loop mode and the second is operated in an open loop whole angle mode; and a second time interval during which the first resonator is operated in an open loop mode and the second is operated in a closed loop mode; wherein by alternately proceeding between open and closed loop operation, each of the first and second resonators scale factor may be self-calibrated.

Another embodiment of the present method and apparatus encompasses a method. The method may comprise: operating one of two resonators of a class II coriolis vibratory gyro in a closed loop mode and another of the two resonators in an open loop whole angle mode; sensing an angular rate by each of the two resonators; calibrating the scale factor of the closed loop resonator to yield the same integrated whole angle as measured by the open loop resonator; reversing operation of the two resonators such that the one of two resonators is operated in an open loop mode and the another of the two resonators in a closed loop whole angle mode; and alternately proceeding between open and closed loop operation of the two resonators, thereby self-calibrating scale factors respectively of the two resonators.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Figure 1:
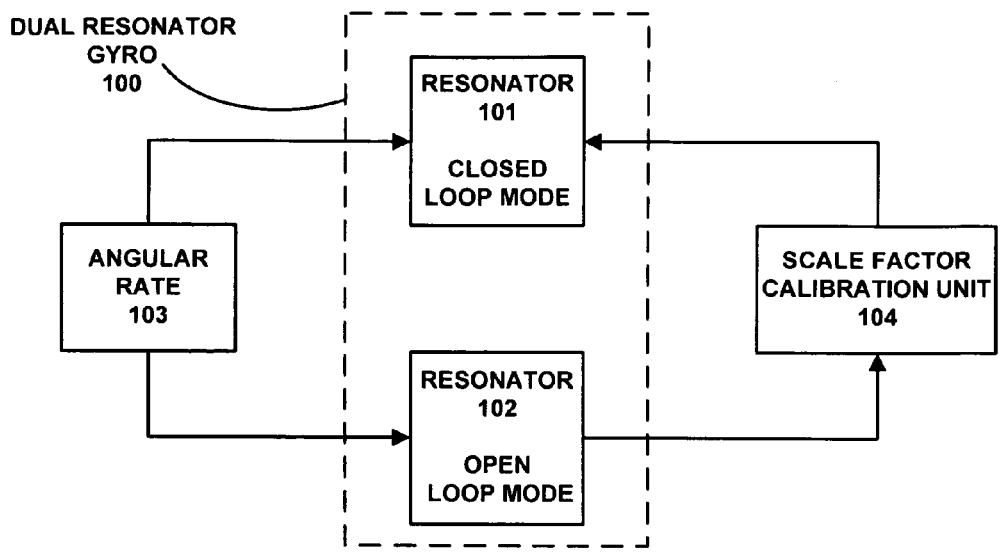
FIG. 1 is a schematic diagram of one embodiment according to the present method and apparatus, an operating mode of the DRG may be selected that operates a first resonator in the closed loop mode and the second resonator in the open loop whole angle mode.

Vibratory gyros can be seen as a collective name for mechanical devices that in various ways use Coriolis acceleration to sense rotation. These gyros appear in a large number of shapes and are also known as tuning forks, vibrating disk resonators, vibrating hemispheric resonator etc. For many applications they can be very small and manufactured in large numbers by using MEMS-technology (Micro-machined Electro Mechanical Systems). Mass market applications, for example car safety systems, makes it possible to design a gyro for each application, thus the shape of such gyros can vary considerably, but almost all of these gyros use the Coriolis acceleration to sense rotation. A Coriolis acceleration results from a linear motion orthogonal to a rotation.

The Dual Resonator Gyro (DRG) provides the opportunity to self-calibrate gyro scale factor due to the ability of Class II CVG to operate in either in the closed loop or open loop whole angle mode. In the whole angle mode the gyro may be an angular displacement sensor with a highly precise scale factor. An operating mode of the DRG may be selected that operates one resonator in the closed loop mode and the second resonator in the open loop whole angle mode. With both sensing element resonators experiencing the same angular rate, the scale factor of the closed loop resonator may be calibrated to yield the same integrated whole angle as measured by the open loop resonator. In a second time interval the modes of operation of the two resonators are reversed. The original closed loop resonator is now open loop and the original open loop resonator is now closed loop. Alternately proceeding between open and closed loop operation, each resonator's scale factor may be self-calibrated. Scale factor self-calibration may be combined with bias self-calibration with the mode of operation being a function of the motion of the inertial system. Bias self-compensation is best performed during periods of low angular motion while scale factor self-calibration is best performed during periods of increased angular motion.

In general, a gyro is a sensor that gives information about angular rate or how fast its turning. Because the gyro's output indicates how fast an object is turning, the output signal must be integrated or added up over time. Integration involves periodically sampling the gyro with an analog to digital converter, multiplying the resulting number by the number of seconds between samples and adding it to a static variable that keeps track of the angle.

Gyro bias offset, also known as the zero rate output, is the measured voltage when the gyro is not rotating about its sensitive axis. For example, a gyros may have a bias offset of about 5°/hr. Gyro output measurements above the bias offset indicate rotation in one direction, e.g., clockwise, while output measurements below the bias offset indicate rotation in the opposite direction, e.g., counter-clockwise.

Gyros can be operated closed-loop or open-loop. Closed-loop means that a feedback loop from the gyro pickoff introduces a restoring mechanism either inside the gyro or counter-rotating platform motions to maintain the gyro pickoff at its null. In open-loop operation, the gyro is allowed to operate off its null position as it responds to the input angular rates.

FIG. 1 is a schematic diagram of one embodiment according to the present method and apparatus. An operating mode of the DRG 100 may be selected that operates a first resonator 101 in the closed loop mode and the second resonator 102 in the open loop whole angle mode. With both sensing element resonators 101, 102 experiencing the same angular rate 103, the scale factor of the closed loop resonator 101 may be calibrated, in a first time interval, by a scale factor calibration unit 104 to yield the same integrated whole angle as measured by the open loop resonator 102. In a second time interval the modes of operation of the two resonators 101, 102 are reversed, FIG. 2. The original closed loop resonator 101 is now open loop and the original open loop resonator 102 is now closed loop. Alternately proceeding between open and closed loop operation, each resonator's scale factor may be self-calibrated.

Figure 2:
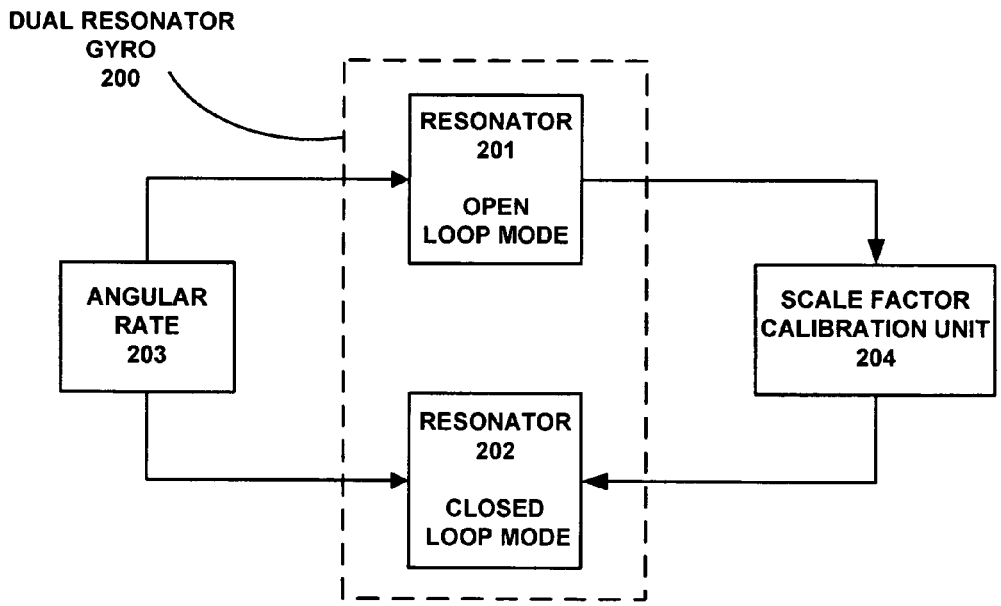
FIG. 2 is a schematic diagram of the FIG. 1 embodiment in which the first resonator operates in an open loop mode and in which the second resonator operates in a closed loop mode.

FIG. 2 is a schematic diagram of the FIG. 1 embodiment in which the first resonator 201 operates in an open loop mode and in which the second resonator 202 operates in a closed loop mode. With both sensing element resonators 201, 202 experiencing the same angular rate 203, the scale factor of the closed loop resonator 202 may be calibrated by a scale factor calibration unit 204 to yield the same integrated whole angle as measured by the open loop resonator 201. In a second time interval the modes of operation of the two resonators 201, 202 are reversed. The original closed loop resonator 201 is now open loop and the original open loop resonator 202 is now closed loop. Alternately proceeding between open and closed loop operation, each resonator's scale factor may be self-calibrated.

Figure 3:
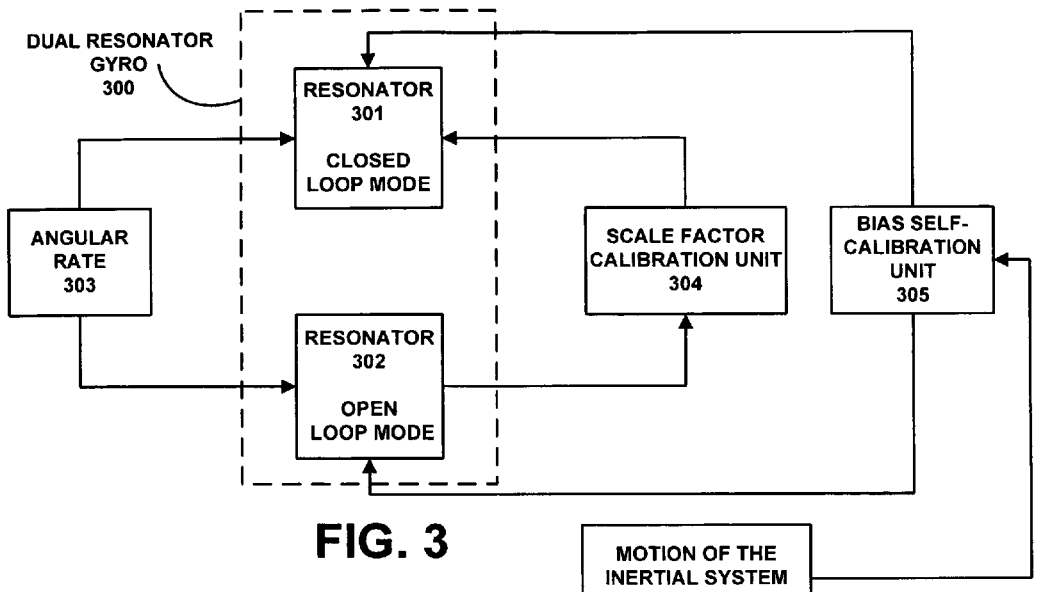
FIG. 3 is a schematic diagram of one embodiment according to the present method and apparatus, an operating mode of the DRG being selected that operates a first resonator in the closed loop mode and the second resonator in the open loop whole angle mode.

FIG. 3 is a schematic diagram of one embodiment according to the present method and apparatus. An operating mode of the DRG 300 may be selected that operates a first resonator 301 in the closed loop mode and the second resonator 302 in the open loop whole angle mode. With both sensing element resonators 301, 302 experiencing the same angular rate 303, the scale factor of the closed loop resonator 301 may be calibrated, in a first time interval, by a scale factor calibration unit 304 to yield the same integrated whole angle as measured by the open loop resonator 302. In a second time interval the modes of operation of the two resonators 101, 102 are reversed. The original closed loop resonator 301 is now open loop and the original open loop resonator 302 is now closed loop. Alternately proceeding between open and closed loop operation, each resonator's scale factor may be self-calibrated. Scale factor self-calibration may be combined with bias self-calibration by a bias self-calibration unit 305 with the mode of operation being a function of the motion 306 of the inertial system. In the time periods when bias-self calibrations occur, mode reversal operation takes place. In the time periods when scale factor operations occur, open to closed loop operation takes place. Bias self-compensation is best performed during periods of low angular motion while scale factor self-calibration is best performed during periods of increased angular motion.

Figure 4:
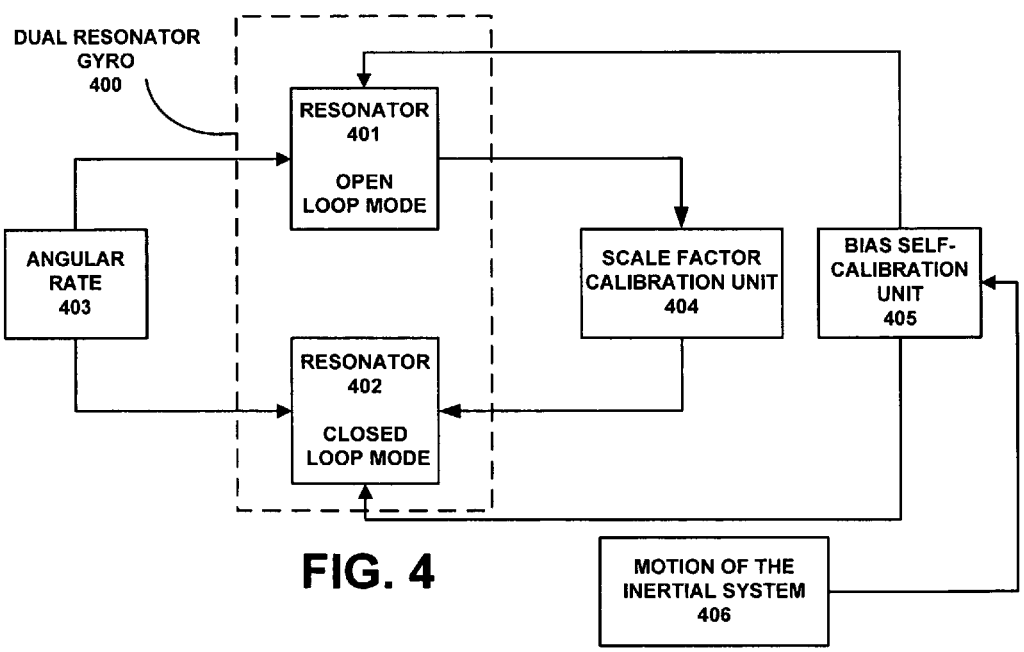
FIG. 4 is a schematic diagram of the FIG. 3 embodiment in which the first resonator operates in an open loop mode and in which the second resonator operates in a closed loop mode.

FIG. 4 is a schematic diagram of the FIG. 3 embodiment in which the first resonator 401 operates in an open loop mode and in which the second resonator 402 operates in a closed loop mode. With both sensing element resonators 401, 402 experiencing the same angular rate 403, the scale factor of the closed loop resonator 402 may be calibrated by a scale factor calibration unit 404 to yield the same integrated whole angle as measured by the open loop resonator 401. In a second time interval the modes of operation of the two resonators 401, 402 are reversed. The original closed loop resonator 401 is now open loop and the original open loop resonator 402 is now closed loop. Alternately proceeding between open and closed loop operation, each resonator's scale factor may be self-calibrated. As explained above, scale factor self-calibration may be combined with bias self-calibration by a bias self-calibration unit 305 with the mode of operation being a function of the motion 306 of the inertial system. In the time periods when bias-self calibrations occur, mode reversal operation takes place. In the time periods when scale factor operations occur, open to closed loop operation takes place. Bias self-compensation is best performed during periods of low angular motion while scale factor self-calibration is best performed during periods of increased angular motion.

Figure 5:
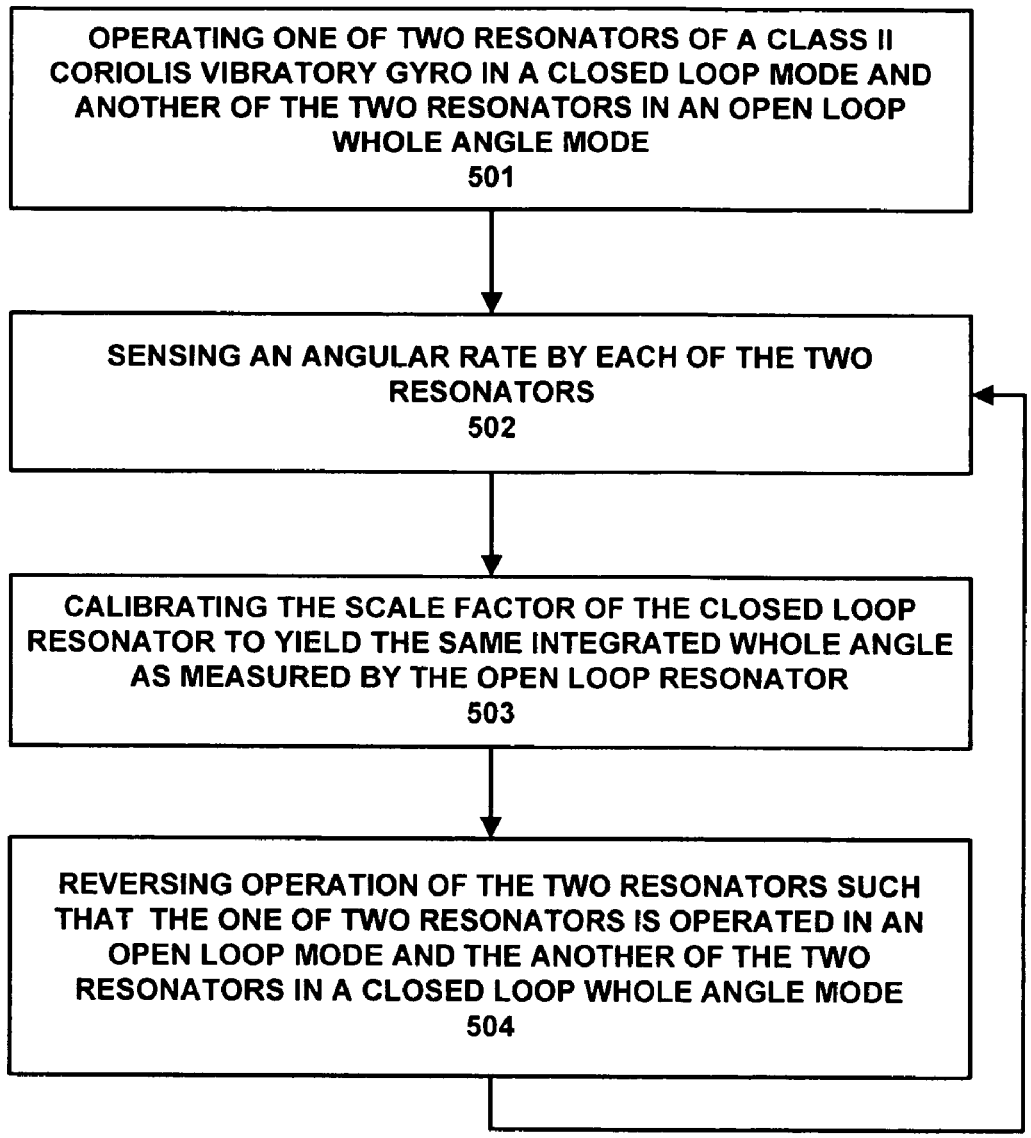
FIG. 5 depicts one embodiment according to the present method.

FIG. 5 depicts one embodiment according to the present method. In general terms, this embodiment may have the following steps: operating one of two resonators in a closed loop mode and another of the two resonators in an open loop whole angle mode (501); sensing an angular rate by each of the two resonators (502); calibrating the scale factor of the closed loop resonator to yield the same integrated whole angle as measured by the open loop resonator (503); and reversing operation of the two resonators such that the one of two resonators is operated in an open loop mode and the another of the two resonators in a closed loop whole angle mode (504), and alternately proceeding between open and closed loop operation of the two resonators, thereby self-calibrating scale factors respectively of the two resonators.

The present apparatus in one example may comprise a plurality of components such as one or more of electronic components, hardware components, and computer software components. A number of such components may be combined or divided in the apparatus.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

I claim:

1. An apparatus, comprising:
   a first resonator receiving on an input thereof an angular rate, said first resonator operating in a closed loop mode during a first time interval and in an open loop whole angle mode during a second time interval;
   a second resonator receiving on an input thereof the angular rate, said second resonator operating in an open loop whole angle mode during a first time interval and in a closed loop mode during a second time interval; and
   scale factor calibration unit operatively coupled to the first and second resonators;
   wherein by alternately proceeding between open and closed loop operation, each of the first and second resonators scale factor may be self-calibrated.

2. The apparatus according to claim 1, wherein the two resonators form a dual resonator gyro.

3. The apparatus according to claim 2, wherein in the whole angle mode the gyro may be an angular displacement sensor with a highly precise scale factor.

4. The apparatus according to claim 2, wherein resonators of the gyro are alternately operated between the closed and open loop modes.

5. An apparatus, comprising:
   a first resonator receiving on an input thereof an angular rate, said first resonator operating in a closed loop mode during a first time interval and in an open loop whole angle mode during a second time interval;
   a second resonator receiving on an input thereof the angular rate, said second resonator operating in an open loop whole angle mode during a first time interval and in a closed loop mode during a second time interval;
   scale factor calibration unit operatively coupled to the first and second resonators; and
   a bias self-calibration unit operatively coupled to the first and second resonators and having an input for receiving a signal indicative of motion of an inertial system;
   wherein by alternately proceeding between open and closed loop operation, each of the first and second resonators scale factor may be self-calibrated, and wherein scale factor self-calibration is combined with bias self-calibration for a mode of operation.

6. The apparatus according to claim 5, wherein scale factor self-calibration is alternated with bias self-calibration of the two resonators with a mode of operation being a function of motion of an inertial system.

7. The apparatus according to claim 6, wherein bias self-compensation is performed during periods of low angular motion of the inertial system, while scale factor self-calibration is performed during periods of increased angular motion of the inertial system.

8. The apparatus according to claim 5, wherein the two resonators form a dual resonator gyro.

9. The apparatus according to claim 8, wherein in the whole angle mode the gyro may be an angular displacement sensor with a highly precise scale factor.

10. The apparatus according to claim 8, wherein resonators of the gyro are alternately operated between the closed and open loop modes.

* * * * *